US009555709B2

(12) United States Patent
Lee et al.

(10) Patent No.: US 9,555,709 B2
(45) Date of Patent: Jan. 31, 2017

(54) APPARATUS FOR OPERATING AVN MONITOR

(71) Applicants: Hyundai Motor Company, Seoul (KR); Kia Motors Corp., Seoul (KR); Hyundai Mobis Co., Ltd., Seoul (KR)

(72) Inventors: Young Ju Lee, Suwon-si (KR); Min Young Lee, Yongin-si (KR); Jong Hyup Kim, Yongin-si (KR); Bock Cheol Lee, Suwon-si (KR); Yong Soo Chang, Seoul (KR); Chan Woong Jung, Yongin-si (KR); Kyung Ho Lee, Yongin-si (KR); Min Geun Oh, Yongin-si (KR)

(73) Assignees: Hyundai Motor Company, Seoul (KR); Kia Motors Corp., Seoul (KR); Hyundai Mobis Co., Ltd., Seoul (KR)

( * ) Notice: Subject to any disclaimer, the term of this patent is extended or adjusted under 35 U.S.C. 154(b) by 75 days.

(21) Appl. No.: 14/079,247

(22) Filed: Nov. 13, 2013

(65) Prior Publication Data

US 2015/0008299 A1 Jan. 8, 2015

(30) Foreign Application Priority Data

Jul. 5, 2013 (KR) .................. 10-2013-0078874

(51) Int. Cl.
*B60K 35/00* (2006.01)
*B60K 37/04* (2006.01)
(Continued)

(52) U.S. Cl.
CPC .............. *B60K 35/00* (2013.01); *B60K 37/04* (2013.01); *B60R 11/0235* (2013.01);
(Continued)

(58) Field of Classification Search
CPC .. B60K 35/00; B60R 11/0258; B60R 11/0235; B60R 2011/0005; B60R 2011/0082; B60R 2011/0084; B60R 2011/0085; B60R 2011/0092
(Continued)

(56) References Cited

U.S. PATENT DOCUMENTS 4,096,008 A * 6/1978 Taylor ............................. 156/96
5,177,730 A * 1/1993 Utsugi ................... G11B 15/10
360/137
(Continued)

FOREIGN PATENT DOCUMENTS

KR 10-0273867 B1 2/2001
KR 10-2004-0108004 A 12/2004

*Primary Examiner* — Jonathan Liu
*Assistant Examiner* — Muhammad Ijaz
(74) *Attorney, Agent, or Firm* — Morgan, Lewis & Bockius LLP

(57) ABSTRACT

An apparatus for operating an AVN (Audio, Video and Navigation) monitor for a vehicle may include a belt guider which is installed in an accommodation space of a dashboard and around which a belt, moving in a longitudinal direction of the belt guider, is wound, a guide rail fixed to the belt guider and extending in the longitudinal direction of the belt guider, a monitor hinge connected to the belt and engaged to the guide rail and an end of a connection bracket so as to move along the guide rail, wherein the connection bracket is connected to the AVN monitor, and a driving force transmission gear engaged with the belt to move the belt in the longitudinal direction.

11 Claims, 15 Drawing Sheets

(51) Int. Cl.
*B60R 11/02* (2006.01)
*B60R 11/00* (2006.01)

(52) U.S. Cl.
CPC .... *B60R 11/0258* (2013.01); *B60K 2350/405* (2013.01); *B60R 2011/0005* (2013.01); *B60R 2011/0082* (2013.01); *B60R 2011/0084* (2013.01); *B60R 2011/0085* (2013.01); *B60R 2011/0092* (2013.01)

(58) Field of Classification Search
USPC ........ 248/27.1, 27.3, 224.51, 572, 570, 602, 248/125.2, 416; 349/11, 12, 58
See application file for complete search history.

(56) References Cited

U.S. PATENT DOCUMENTS

| | | | |
|---|---|---|---|
| 5,181,771 A * | 1/1993 | Robak et al. .................. 312/7.2 | |
| 5,184,489 A * | 2/1993 | Squires .............. B60R 11/0205 | 296/37.12 |
| 5,328,709 A * | 7/1994 | Larsen .................. A21C 9/063 | 426/297 |
| 5,467,106 A * | 11/1995 | Salomon ............ B64D 11/0015 | 345/87 |
| 6,978,995 B2 * | 12/2005 | Middelberg ....... B65H 31/3081 | 271/198 |
| 6,997,504 B1 * | 2/2006 | Lang ....................... E05D 3/127 | 16/334 |
| 7,316,306 B2 * | 1/2008 | Ahn et al. ..................... 194/344 |
| 7,685,901 B2 * | 3/2010 | Leopold ................. B60R 11/02 | 296/24.34 |
| 8,259,437 B2 | 9/2012 | Vesely | |
| 2002/0001049 A1 * | 1/2002 | Endo ...................... B60K 35/00 | 349/58 |
| 2002/0005897 A1 * | 1/2002 | Kim ....................... F16M 11/10 | 348/148 |
| 2003/0142063 A1 * | 7/2003 | Wang ................. B60R 11/0235 | 345/156 |
| 2003/0234550 A1 * | 12/2003 | Brooks ................ B60N 2/4646 | 296/24.46 |
| 2005/0056734 A1 * | 3/2005 | Lee ..................... B60R 11/0235 | 248/27.3 |
| 2005/0144819 A1 * | 7/2005 | Shimizu ................ B60K 35/00 | 40/491 |
| 2005/0236527 A1 * | 10/2005 | Takagi ................... B60K 35/00 | 248/27.1 |
| 2006/0209261 A1 * | 9/2006 | Tak ........................ B60K 35/00 | 353/13 |
| 2007/0040949 A1 * | 2/2007 | Lin ..................... B60R 11/0235 | 348/837 |
| 2007/0216592 A1 * | 9/2007 | Park ............................. 343/765 | |
| 2009/0096258 A1 * | 4/2009 | Kim ....................... B60K 35/00 | 297/188.17 |
| 2009/0135328 A1 * | 5/2009 | Serizawa ........... B60R 11/0235 | 349/58 |
| 2010/0226086 A1 * | 9/2010 | Kissel ................ B60R 11/0235 | 361/679.21 |
| 2011/0247770 A1 | 10/2011 | Dietzel et al. | |
| 2013/0025393 A1 * | 1/2013 | Lee ........................ B60R 11/02 | 74/411 |
| 2014/0320768 A1 * | 10/2014 | Hagiwara .............. B60K 35/00 | 349/12 |
| 2015/0008299 A1 * | 1/2015 | Lee ........................ B60K 35/00 | 248/286.1 |

* cited by examiner

APPARATUS FOR OPERATING AVN MONITOR

CROSS-REFERENCE TO RELATED APPLICATION

The present application claims priority to Korean Patent Application No. 10-2013-0078874, filed on Jul. 5, 2013, the entire contents of which is incorporated herein for all purposes by this reference.

BACKGROUND OF THE INVENTION

Field of the Invention

The present invention relates, in general, to an apparatus for operating an AVN (Audio, Video and Navigation) monitor for a vehicle and, more particularly, to an apparatus for operating an AVN monitor for a vehicle which causes the AVN monitor to be retracted into or extended out of a dashboard.

Description of Related Art

Due to the trend of luxurious cars, a growing number of vehicles are equipped with an AVN (Audio, Video and Navigation) monitor 101 embedded in a center fascia located between driver's compartment and passenger compartment as illustrated in FIG. 1. In addition, the size of the monitor 101 has increased over time to allow a driver to easily grasp information displayed on the monitor 101.

Such a trend of large monitors 101 leads to an increased height H1 of a dashboard, resulting in a crude design and impeding a sense of luxury in the vehicle. Furthermore, the increased height H1 of the dashboard 101 hinders a driver from viewing the front road. Yet furthermore, air from air vents 103 installed at left and right sides of the monitor 101 causes a driver to suffer from cold hands, and the air is unlikely to be smoothly vented because the air flow from the air vents 103 is hindered by a steering wheel.

In order to solve these problems, the following AVN monitor 201 is proposed, it is usually accommodated in a dashboard 202 as illustrated in FIG. 2A, and when the occasion demands, is extended out of the dashboard 202 to protrude from the dashboard 202 as illustrated in FIG. 2B.

With adoption of the structure illustrated in FIGS. 2A and 2B, even when the monitor 201 has an increased size, the dashboard 202 is allowed to have a decreased height H2 so the above-enumerated problems can be solved. That is, a sense of luxury in the design of a vehicle is enhanced and a driver can better see the front road of a vehicle. Moreover, since air vents 203 are installed in a center position of a center fascia, the driver will not suffer from cold hands.

As an example of an operation apparatus for causing the AVN monitor 201 to be retracted into or extended out of the dashboard 202, there is a cable-type operation apparatus illustrated in FIGS. 3 and 4.

FIG. 3 illustrates a state in which the AVN monitor 201 is accommodated in the dashboard 202 and FIG. 4 illustrates a state in which the AVN monitor 201 protrudes from the dashboard 202. Upon operation of a motor 211, a winding roller 212 starts rotating and a cable 213 moves along an idling roller 214 in response to the rotation of the winding roller 212. The cable 214 is connected to an end of a driver arm 215 in a hinged manner, and the other end of the driver arm 215 is connected to a lower end of the monitor 210 in a hinged manner. Accordingly, when the cable 213 moves the driver arm 315 and the monitor 201 also move. When the monitor 201 is moved by the cable 213, a guide bracket 216 of the monitor 201 moves along a guide path 218 formed in a dashboard 217.

When the driver arm 215 is moved by the cable 214 to be positioned at the right side as illustrated in FIG. 3, the AVN monitor 201 is inserted into an accommodation space 219 of the dashboard 217 and remains in a stored state. Conversely, when the driver arm 215 is moved by the cable 213 to be positioned at the left side as illustrated in FIG. 4, the AVN monitor 201 is extended out of the accommodation space 219 so as to protrude from the dash board 217.

Since a conventional operation apparatus uses the cable 213, it generates severe operational noise. In addition, since the cable 213 is made from a material which easily changes in tension with temperature, the AVN monitor 201 cannot be smoothly retracted into or extended out of the dashboard at times. Furthermore, since there is a variation in the amount of operation between the left and right portions of the monitor 201, the monitor 201 shakes sideways while it is moving.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for operating an AVN monitor having the following advantages, since the AVN monitor is retracted into or extended out of a dashboard using a driving force transmission gear having a simple structure and a belt, operational noise is reduced compared with use of a conventional operation apparatus using a cable. Since the operation apparatus according to an exemplary embodiment of the present invention adopts a structure unsusceptible to external temperature change, the AVN monitor can be retracted into or extended out of the dashboard smoothly and at a constant speed. Since there is no variation in the amount of operation between left and right portions of the AVN monitor, the AVN monitor can stably move. Since the AVN monitor is supported by a tension module in an open state in which the AVN monitor is extended out of the dashboard, shaking of the monitor is prevented.

In an aspect of the present invention, an apparatus for operating an AVN (Audio, Video and Navigation) monitor for a vehicle, may include a belt guider which is installed in an accommodation space of a dashboard and around which a belt, moving in a longitudinal direction of the belt guider, is wound, a guide rail fixed to the belt guider and extending in the longitudinal direction of the belt guider, a monitor hinge connected to the belt and engaged to the guide rail and an end of a connection bracket so as to move along the guide rail, wherein the connection bracket is connected to the AVN monitor, and a driving force transmission gear engaged with the belt to move the belt in the longitudinal direction.

The apparatus may further include a body bracket including a support portion connected to the belt guider and supporting the AVN monitor to allow the AVN monitor to move along a non-linear curved path so as to be extended out of the accommodation space of the dashboard when the monitor hinge moves along the guide rail, and prevents the AVN monitor from collapsing.

The apparatus may further include a tension module installed on the belt guider, the tension module elastically supporting a bottom surface of the AVN monitor in an open state in which the AVN monitor is fully extended out of the accommodation space of the dashboard so that the AVN monitor does not shake.

The belt guider may include a guide plate which extends in the longitudinal direction of the vehicle and is installed in the accommodation space of the dashboard and to which the guide rail is fixed, a driving pulley which is provided at an end of the guide plate, is rotatably installed via a main shaft, and rotates by a driving force which is transmitted from a motor via the driving force transmission gear, a driven pulley which is rotatably installed at a remaining end of the guide plate, and the belt which is wound around the driving pulley and the driven pulley.

The belt guider may further include an idling roller and a pair of tension-adjusting rollers which are rotatably connected to the guide plate and installed between the driving pulley and the driven pulley, wherein the idling roller and the pair of tension-adjusting rollers contact the belt in order to adjust tension of the belt.

The monitor hinge may include an outer hinge having a rail groove which is formed in a bottom surface and faces down and into which the guide rail is inserted, and a hinge groove which is formed, in a position corresponding to the rail groove, in a top surface and faces up, the outer hinge moving along the guide rail, an inner hinge inserted in the hinge groove of the outer hinge, and a hinge pin which is installed to pass through the outer hinge and the inner hinge so that the outer hinge and the inner hinge are combined with each other, and which allows an end of the connection bracket to be rotatably connected to the outer hinge, and wherein the belt is combined with the monitor hinge and the belt is inserted between the outer hinge and the inner hinge.

The driving force transmission gear may include a worm gear and a helical gear which are rotated by the driving force of the motor, a driving gear which rotates by receiving a driving force from the helical gear so that the driving gear rotates in the same direction as the helical gear, and a driven gear which meshes with the driving gear and is connected to an end of the main shaft.

The connection bracket is connected to a center position of a lower end of the AVN monitor so there is no variation in amount of operation between left and right portions of the AVN monitor.

A metal wire is embedded in the belt so that tension change of the belt attributable to external temperature change is minimized.

The worm gear and a shaft of the motor are combined, and the motor is fixedly installed in the accommodation space and disposed at a side of the belt guider.

The tension module may include a tension housing which is fixed to the guide plate and may have an operation groove therein, a tension pin which is installed to move along the operation groove, and an end of which protrudes from the tension housing and is in contact with a bottom surface of the outer hinge, and a tension spring which is installed in the operation groove and respective ends of which are supported by the tension housing and the tension pin, the tension spring giving elastic force to the tension pin so that the tension pin presses a bottom surface of the outer hinge.

An end of the tension pin which is in contact with the bottom surface of the outer hinge may have an arc shape so that the bottom surface of the outer hinge smoothly moves over the end of the tension pin.

An apparatus for operating an AVN monitor according to an exemplary embodiment of the present invention may have the following advantages, with use of a driving force transmission gear having a simple structure and a belt, the number of parts is reduced, resulting in a decrease in cost and weight of the apparatus, by not using a cable, operational noise is reduced, an AVN monitor can be retracted into or extended out of a dashboard smoothly and at a constant speed, since there is no variation in the amount of operation between left and right portions of the AVN monitor, the AVN monitor can stably move, since a hinge structure by which the belt and the AVN monitor are connected is made up of an outer hinge and an inner hinge, the belt can be easily replaced with a new one when the belt is worn out or damaged, since the AVN monitor is elastically supported by a tension module, the AVN monitor is unlikely to shake in an open state in which the AVN monitor is fully extended out of an accommodation space of the dashboard, and the AVN monitor can be maintained in a stable posture.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE INVENTION

Figure 1:
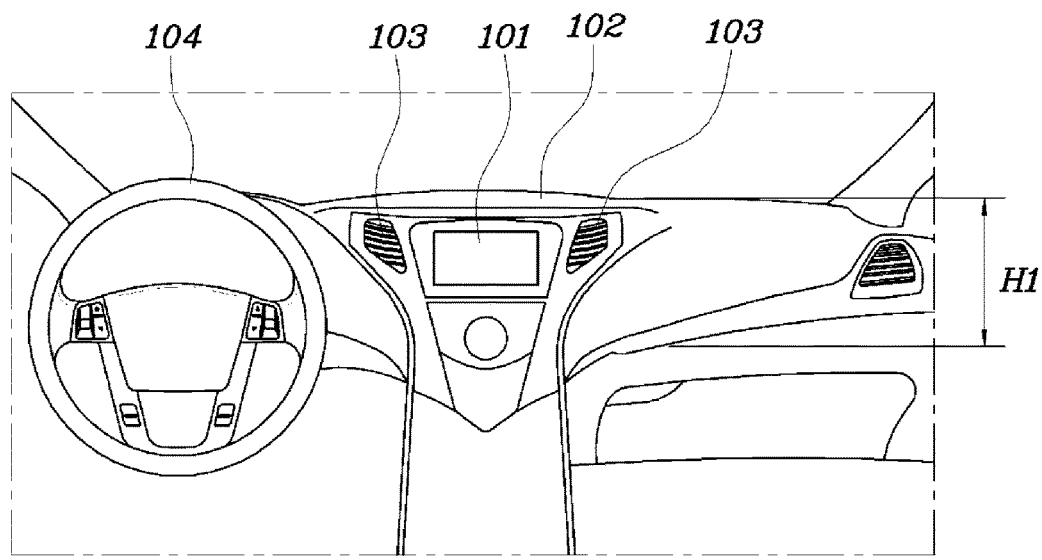
FIG. 1 is a photograph showing a conventional installation structure of an AVN monitor, in which the AVN monitor is embedded in a center fascia.
Figure 2A:
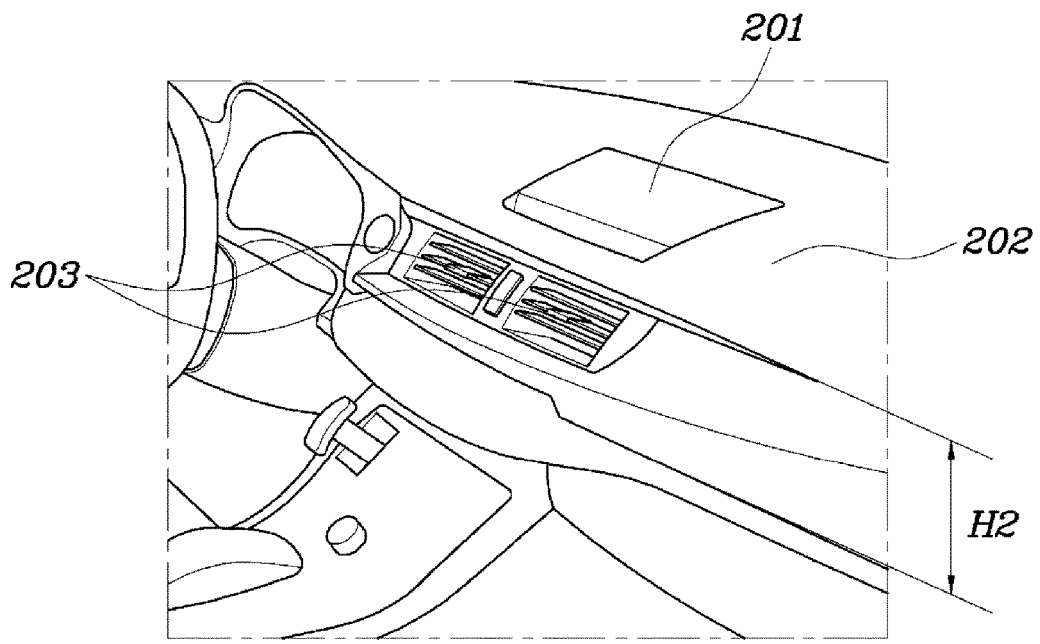
FIG. 2A is a photograph showing a retracted state of an AVN monitor and FIG. 2B is a photograph showing an extended state of the AVN monitor.
Figure 2B:
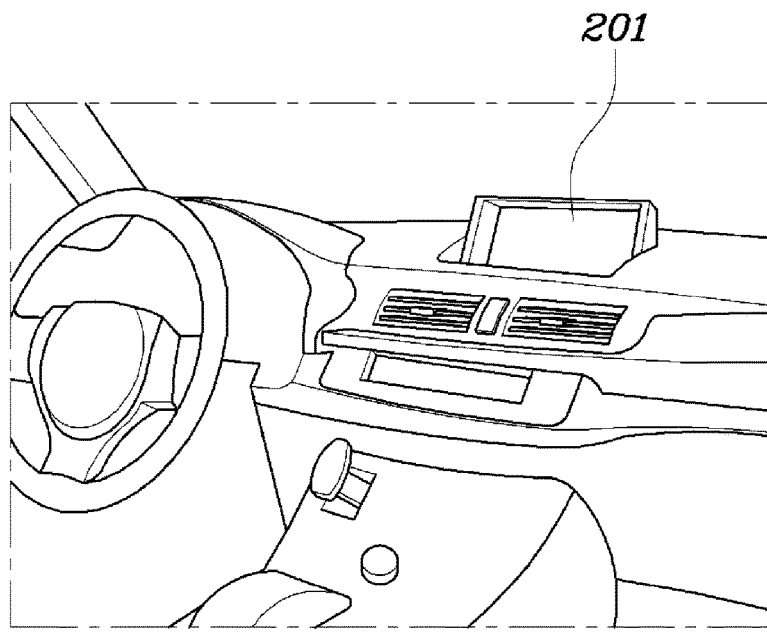
Figure 3:
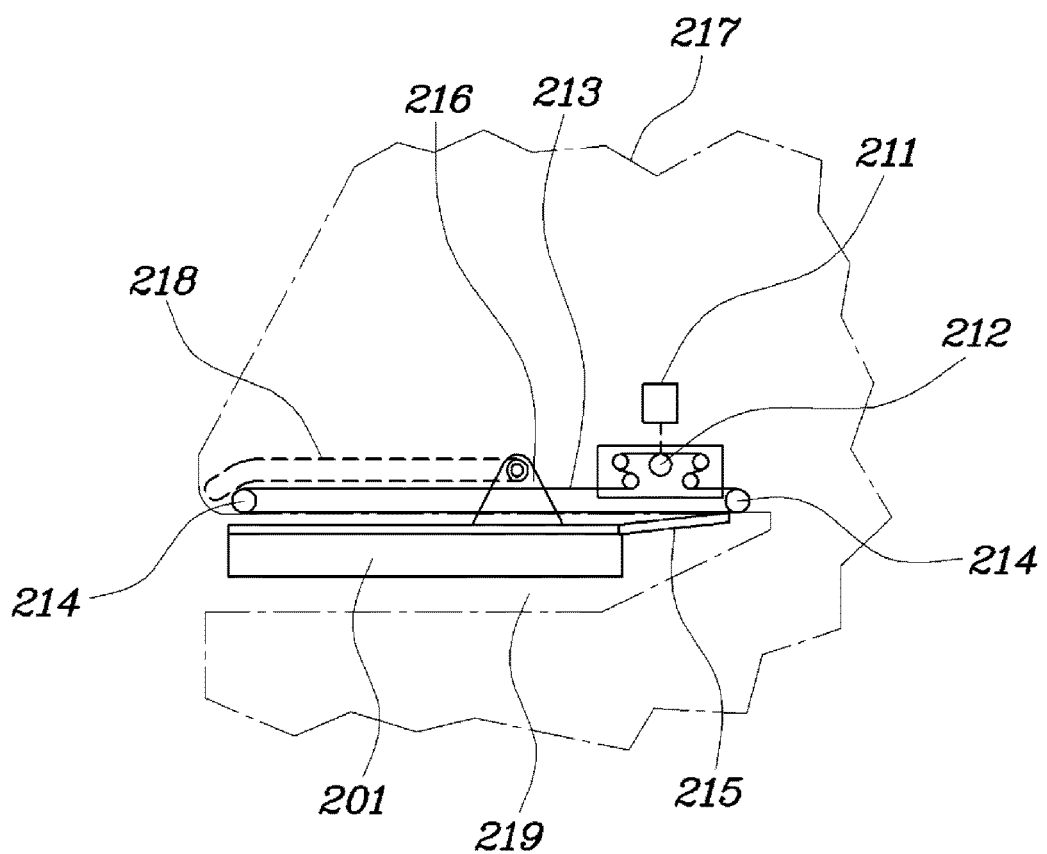
FIGS. 3 and 4 are diagrams describing a conventional apparatus for operating an AVN monitor.
Figure 4:
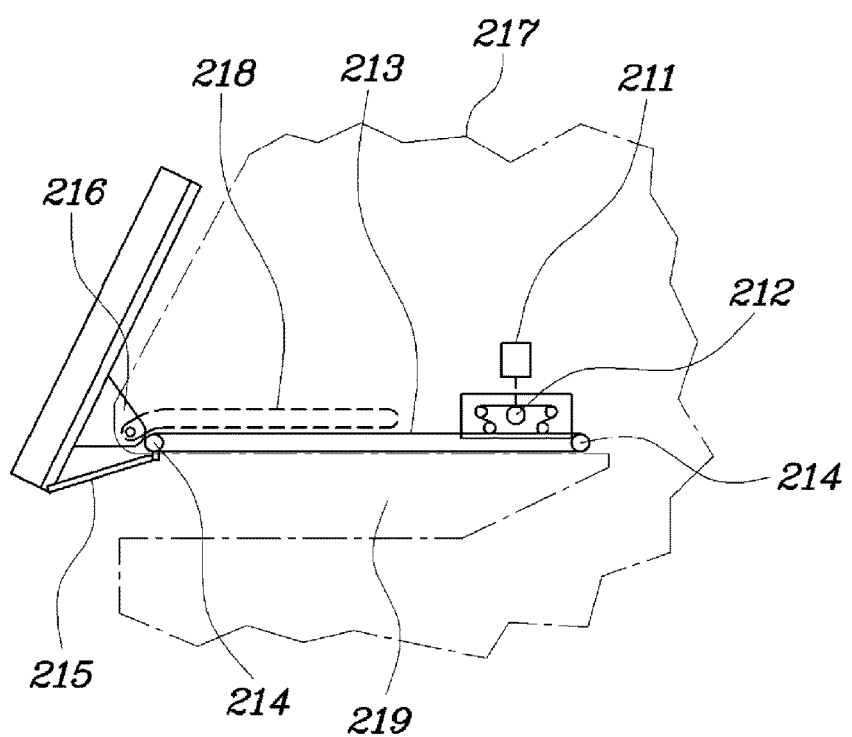

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

An apparatus for operating an AVN monitor according to an exemplary embodiment of the present invention causes the AVN monitor to be retracted into a dashboard when the AVN monitor doesn't need to be used and extended out of the dashboard when the AVN monitor needs to be used.

As illustrated in FIGS. 5 to 14, the apparatus for operating the AVN according to an exemplary embodiment of the present invention includes a belt guider 20, a guide rail 30, a monitor hinge 50, and a driving force transmission gear 70.

The belt guider 20 is installed within an accommodation space 1*a* of a dashboard 1, and a belt 10, moving in a longitudinal direction of a vehicle, is wound around the belt guider 20.

The guide rail 30 extends in the longitudinal direction and is fixed to the belt guider 20.

The monitor hinge 50 is connected to the guide rail 30 so as to move in the longitudinal direction and along the guide rail 30. The monitor hinge 50 is also connected to the belt 210 so as to move along the belt 10. An end of a connection bracket 40 connected to the AVN monitor 3 is rotatably connected to the monitor hinge 50.

The driving force transmission gear 70 transmits the driving force of a motor 60 to the belt guider 20 so that the belt 10 can move in the longitudinal direction.

The apparatus according to an exemplary embodiment of the present invention further includes body brackets 80 which are connected to the belt guider 20. Each body bracket 80 is provided with a support portion 81 which supports the AVN monitor 3 so that the AVN monitor 3 can move along a non-linear curved path so as to be extended out of or retracted into the accommodation space 1*a* when the monitor hinge 50 moves along the guide rail 30. The support portions 81 of the body brackets 80 also prevent the AVN monitor 3 from collapsing.

Preferably, the support portions 81 of the body brackets 80 are installed in such a manner that they are in contact with respective side surfaces of an upper portion of the AVN monitor 3, preventing the AVN monitor 3 from collapsing.

Figure 15:
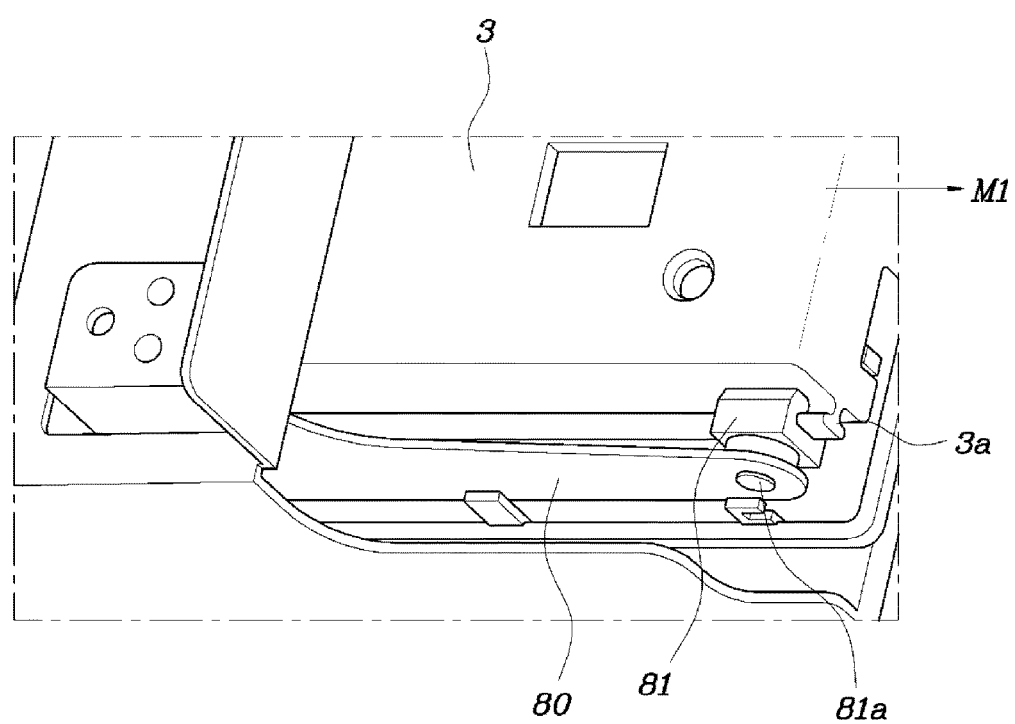
FIG. 15 is a diagram for illustrating a support portion of a body bracket according to an exemplary embodiment of the present invention.

As illustrated in FIG. 15, monitor rails 3*a* are integrally formed with the AVN monitor 3. The monitor rails 3*a* are provided on the respective side ends of the AVN monitor 3. Each support portions 81 is rotatably attached to the inside surface of the corresponding body bracket 80 by a hinge structure and a hinge pin 81*a*. Each support portion 81 has a groove so that the monitor rails 3*a* are inserted in the grooves. When the AVN monitor 3 changes from the retracted state to the extended state (as indicated by arrow M1), the support portions 81 pivot on the hinge pins 81*a* and guide movement of the AVN monitor 3. With such a structure, even though the monitor hinge 50 linearly moves along the guide rail 30, the AVN monitor 3 can be moved along a non-linear curved path thanks to the guide of the support portions 81 so that it can be extended out of the accommodation space 1*a*.

Preferably, a shock-absorbing structure may be provided between the support portion 81 of the body bracket 80 and the AVN monitor 3 in order to reduce operational noise, absorb impact, and prevent wearing.

The apparatus according to an exemplary embodiment of the present invention may further include a tension module 90 which is installed on the belt guider 20. The tension module 90 elastically supports the bottom surface of the monitor hinge 50, preventing the AVN monitor 3 from shaking when the AVN monitor 3 is in the open state in which the AVN monitor 3 is completely extended out of the accommodation space 1*a*.

The belt guider 20 includes a guide plate 21, a driving pulley 23, and a driven pulley 24. The guide plate 21 extends in the longitudinal direction of a vehicle in the accommodation space 1*a* and is fixed to the guide rail 30. The driving pulley 23 is rotatably connected to an end of the guide plate 21 via a main shaft 22, and rotates by the driving force which is transmitted from the motor 60 by the driving force transmission gear 70. The driven pulley 24 is rotatably connected to the other end of the guide plate 21. The belt 10 is installed to wound around the driving pulley 23 and the driven pulley 24.

The belt guider 20 further includes an idling roller 25 and a pair of tension-adjusting rollers 26 which are installed between the driving pulley 23 and the driven pulley 24 and rotatably connected to the guide plate 21. The idling roller 25 and the pair of tension-adjusting rollers 26 adjust the tension of the belt 10.

The monitor hinge 50 includes an outer hinge 51, an inner hinge 52, and a hinge pin 53. The outer hinge 51 has a rail groove 51*a* in the bottom surface. The rail groove 51*a* faces down. The guide rail 30 is inserted into the rail groove 51*a* so that the outer hinge 51 can move along the guide rail 30. The outer hinge 51 has a hinge groove 51*b* formed in the top surface in a position corresponding to the rail groove 51*a*. The hinge groove 51*b* faces up. The inner hinge 52 is inserted in the hinge recess 51*b* of the outer hinge 51. The hinge pin 53 is installed to pass through the outer hinge 51 and the inner hinge 52 so that the outer hinge 51 and the inner hinge 52 can be combined with each other. An end of the connection bracket 40 is rotatably connected to the monitor hinge 50 by the hinge pin 53. The belt 10 is combined with the monitor hinge 50 by the inner hinge 52 in a manner that the belt 10 is inserted between the outer hinge 51 and the inner hinge 52.

The outer hinge 51 and the inner hinge 52 are combined by the hinge pin 53 so that they can be taken apart from each other by removing the hinge pin 53. Accordingly, the belt 10 can be easily replaced with a new one when the belt 10 is worn out or damaged.

The driving force transmission gear 70 includes a worm gear 71, a helical gear 72, a driving gear 73, and a driven gear 74. The worm gear 71 and the helical gear 72 are rotated by the driving force transmitted from the motor 60. The driving gear 73 rotates in the same direction as the helical gear 72 by receiving the driving force from the helical gear 72. The driven gear 74 meshes with the driving gear 73 and is connected to an end of the main shaft 22 which protrudes from the side surface of the guide plate 21.

The worm gear 72 is connected to a shaft of the motor 60 and meshes with an outer circumferential surface of the helical gear 72. The driving gear 73 is located on one side of the helical gear 72. The center of the helical gear 72 and the center of the driving gear 73 are connected to each other via a gear shaft 75 so that the helical gear 72 and the driving gear 73 can be simultaneously rotated in the same direction.

The outer circumferential surface of the driving gear 73 meshes with the outer circumferential surface of the driven gear 74, and the driving gear 73 and the driven gear 74 rotate in opposite directions. The main shaft 22 passes through the center of the driven gear 74, and the main shaft 22 is connected to the driven pulley 23.

Accordingly, when the driven gear 74 is rotated by the rotational force of the driving gear 73, the main shaft 22 transfers the rotational force of the driven gear 74 to the driving pulley 23 so that the driving pulley 23 can be rotated. The belt 10 wound around the driving pulley 23 and the driven pulley 24 moves along a predetermined track, and at this time the monitor hinge 50 connected to the belt 10 simultaneously moves along the guide rail 30.

While the monitor hinge 50 is moving along the guide rail 30, the AVN monitor 3 connected to the monitor hinge 50 via the connection bracket 40 moves along a non-linear curved path in a state in which it is supported by the support portions 81 of the body brackets 8 so that it can be retracted into or extended out of the accommodation space 1a.

Preferably, the connection bracket 40 is connected to a center portion of a lower end of the AVN monitor 3. Accordingly, there is no variation in the amount of operation between left and right portions of the AVN monitor 3 when the AVN monitor 3 is operated to be retracted into or extended out of the accommodation space.

The worm gear 71 is connected to the shaft of the motor 60, and the motor 60 is located on one side of the belt guider 20 and is fixedly installed in the accommodation space 1a.

A metal wire 11 may be embedded in the belt 10 in order to minimize tension change attributable to external temperature change.

The tension module 90 includes a tension housing 91, a tension pin 92, and a tension spring 93. The tension housing 91 is fixed to the guide plate 21 and has an operation groove 91a. The tension pin 92 is installed to move along the operation groove 91a and has an end which protrudes from the surface of the tension housing 91 and is in contact with the bottom surface of the outer hinge 51. The tension spring 93 is installed in the operation groove 91a and supported by the tension housing 91 and the tension pin 92 at respective ends. The tension spring 93 gives elastic force to the tension pin 92 so that the tension pin 92 can press the bottom surface of the outer hinge 51.

The end of the tension pin 92 which is in contact with the outer hinge 51 has an arc shape so that the bottom surface of the outer hinge 51 can smoothly move over the end of the tension pin 92.

Preferably, the tension spring 93 may be a compression coil spring.

Figure 5:
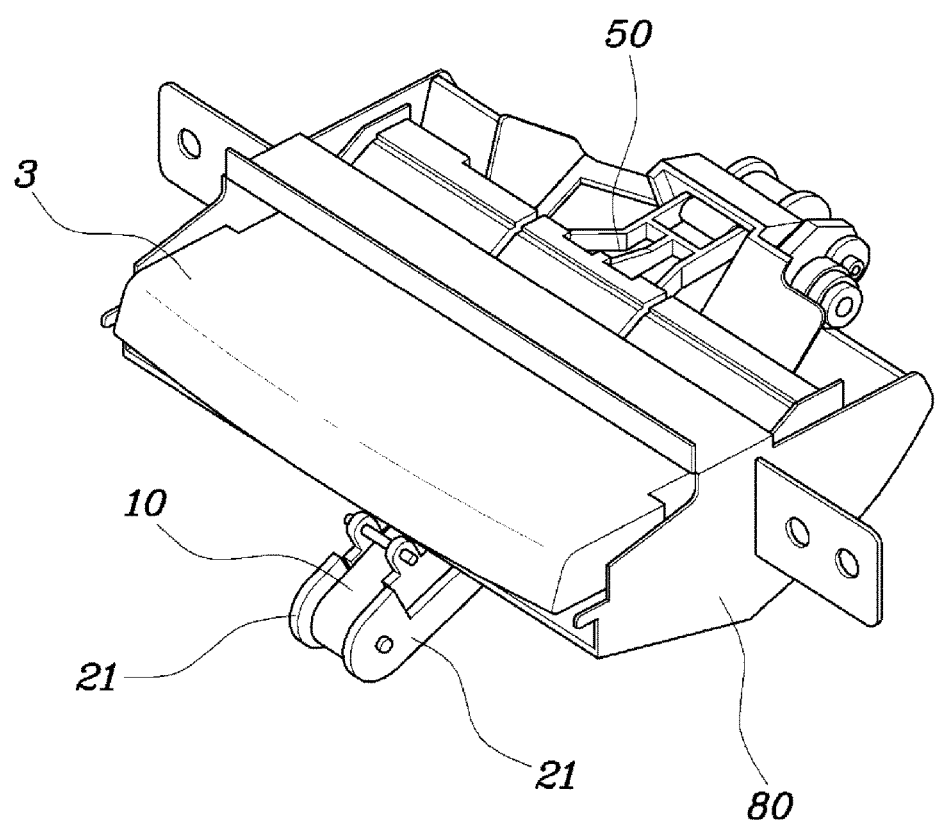
FIGS. 5 to 7 are diagrams illustrating a retracted state and an extended state of an AVN monitor which is operated by an apparatus for operating the AVN monitor according to an exemplary embodiment of the present invention.
Figure 7:
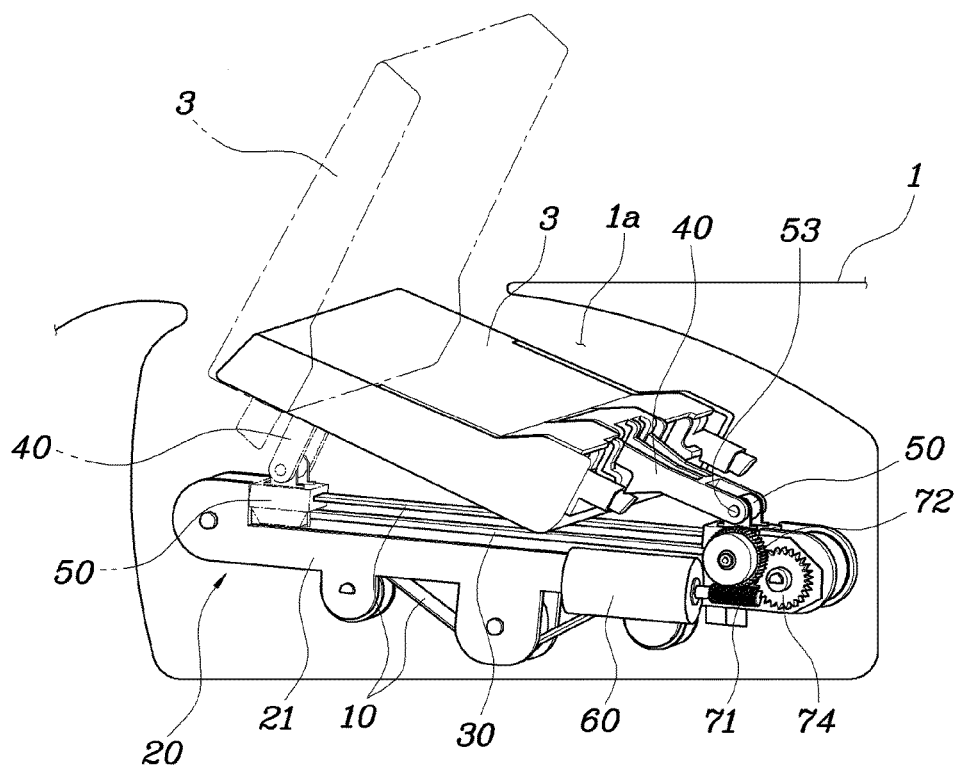

In FIGS. 5 and 7, the state in which the AV monitor 3 is indicated by a solid line is the retracted state in which the AVN monitor 3 is accommodated in the accommodation space 1a of the dashboard 1. In this state, the monitor hinge 50 is positioned near the driving pulley 23.

When the motor 60 starts operating, the worm gear 71, the helical gear 72, the driving gear 73, the driven gear 74, the main shaft 22, and the driving pulley 23 are rotated by the driving force transmitted from the motor 60, and the belt 10 moves along a track which is formed to extend around the driving pulley 23 and the driven pulley 24. At this time, the monitor hinge 50 connected to the belt 10 moves along the guide rail 30 in a direction of approaching a passenger or a driver from the front window side, for example, moves leftward in FIG. 7.

Figure 6:
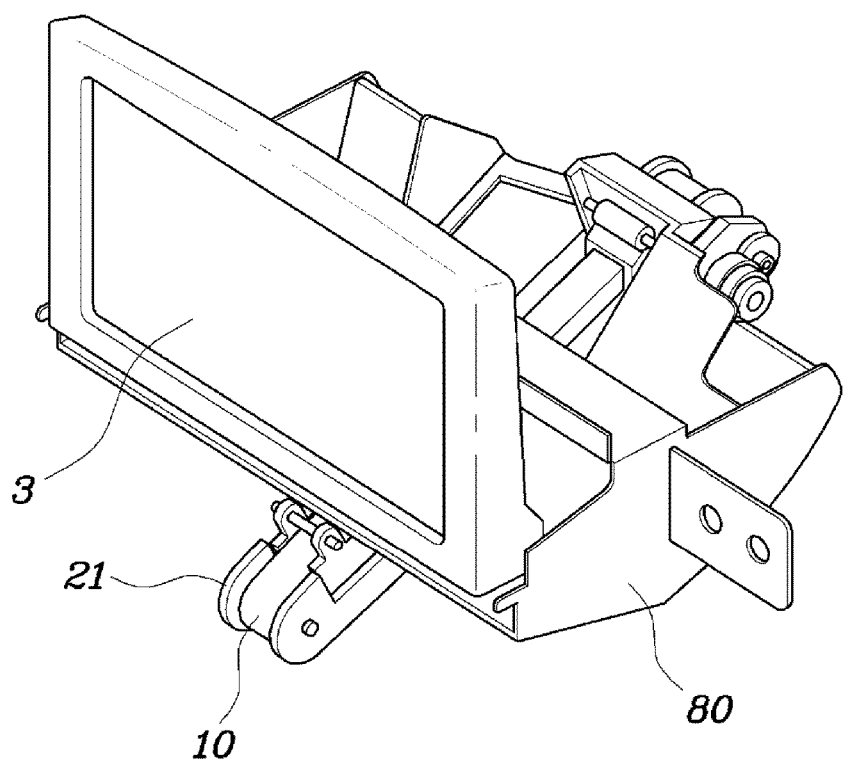
Figure 8:
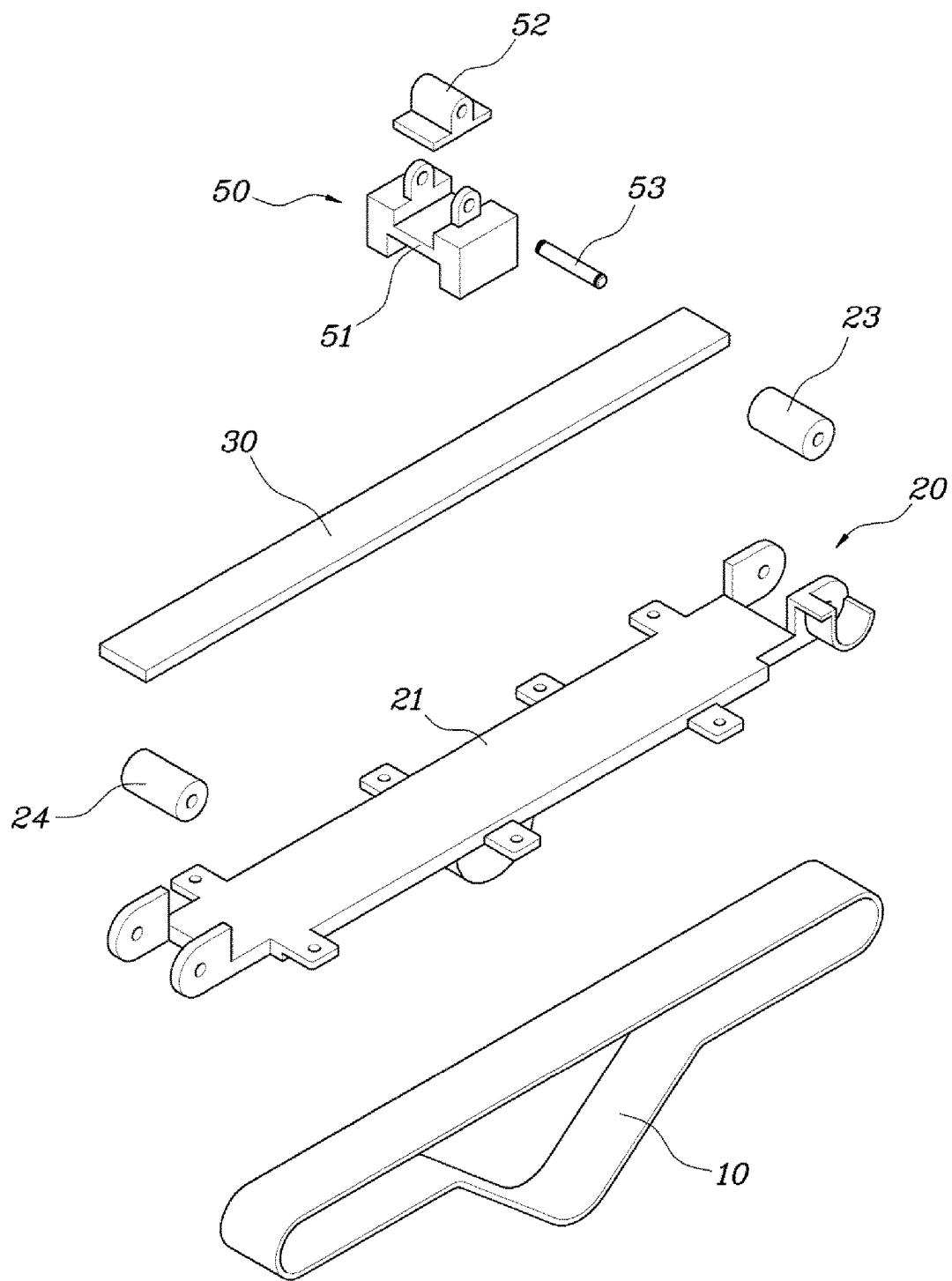
FIG. 8 is an exploded perspective view of a belt guider and a monitor hinge according to an exemplary embodiment of the present invention.
Figure 9:
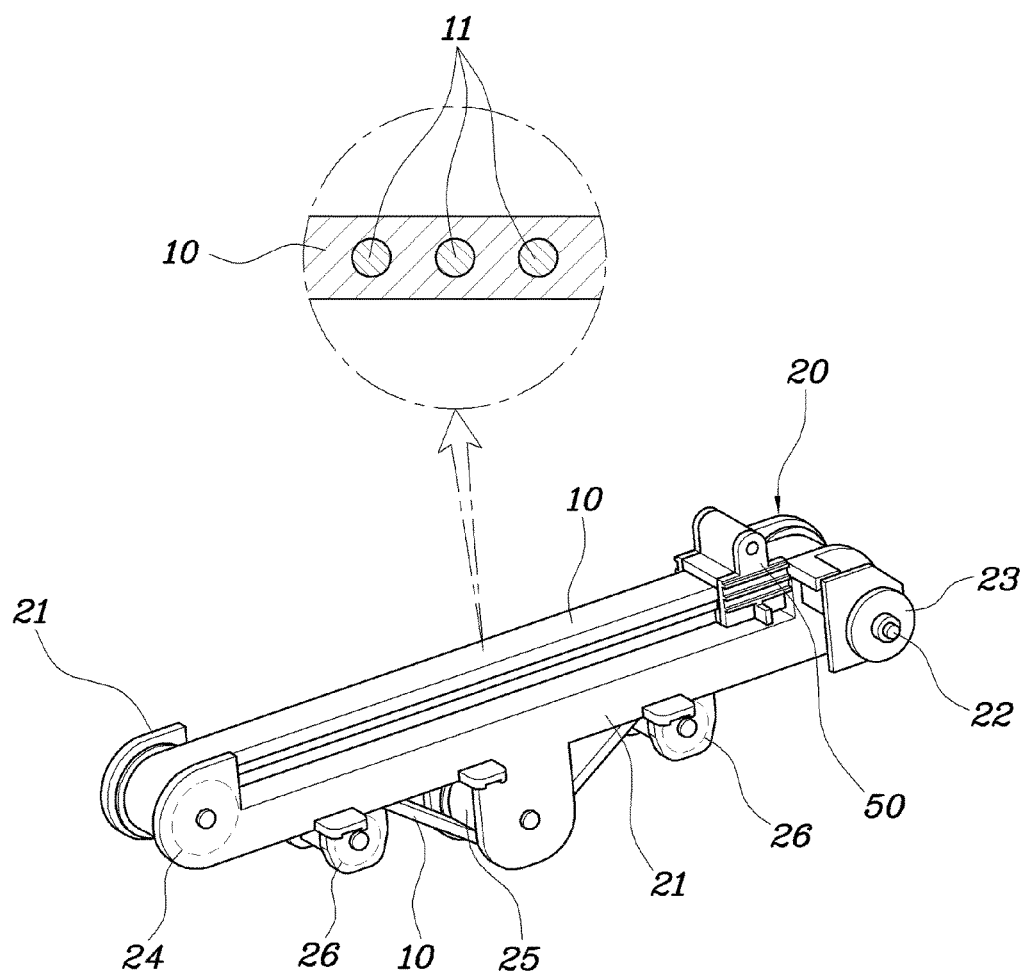
FIG. 9 is a perspective view an assembled state of the belt guider according to an exemplary embodiment of the present invention.
Figure 10:
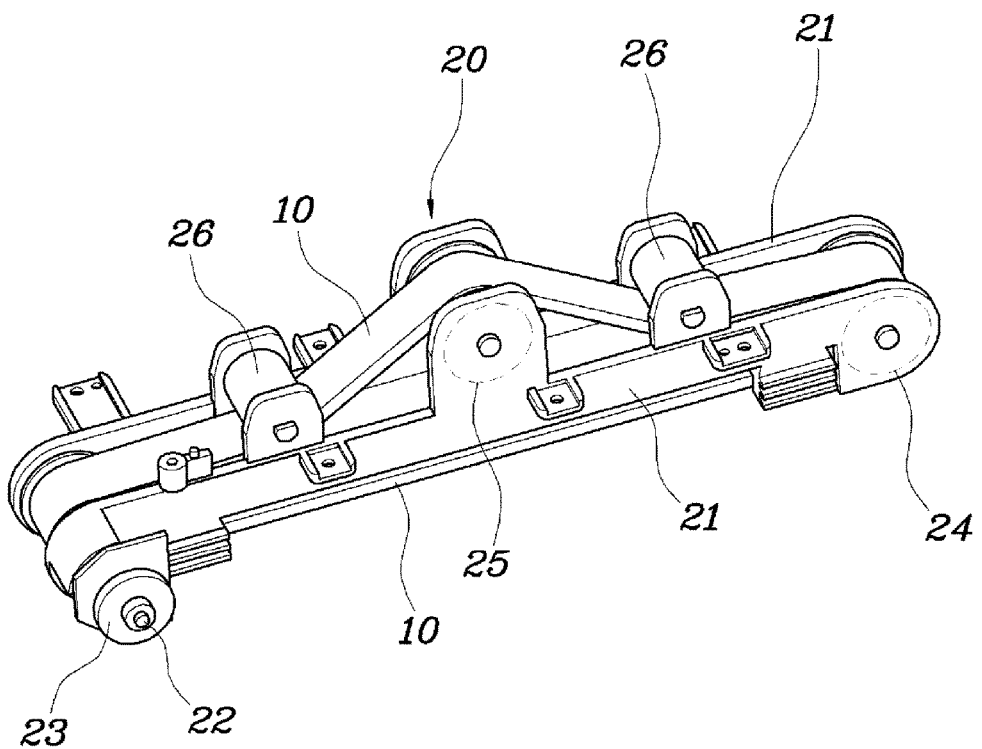
FIG. 10 is a perspective view of the assembled state of the belt guider viewed from below.
Figure 11:
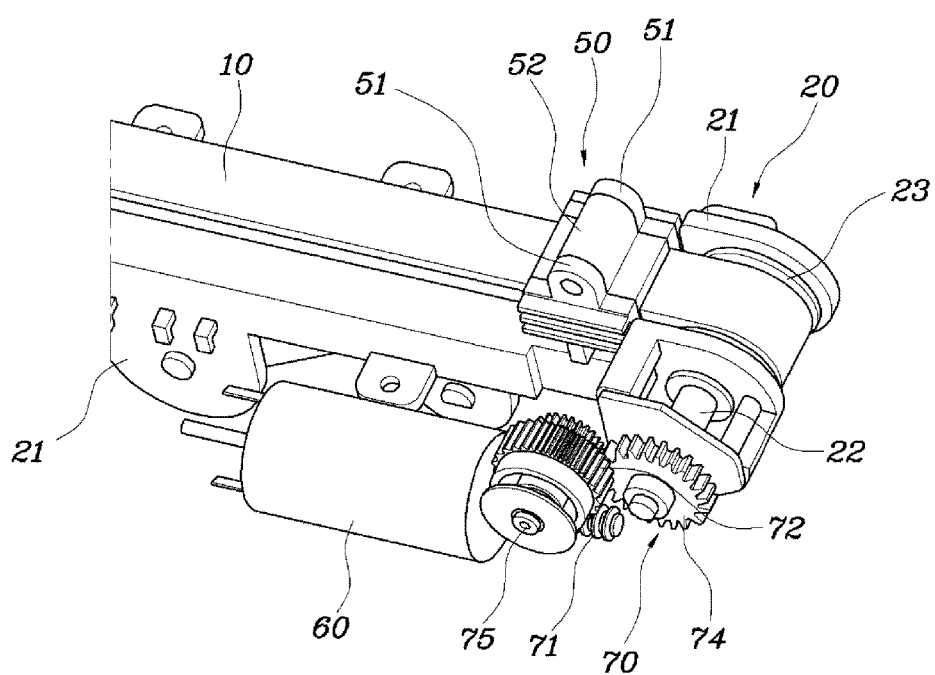
FIGS. 11 and 12 are diagrams illustrating a driving force transmission gear according to an exemplary embodiment of the present invention.
Figure 12:
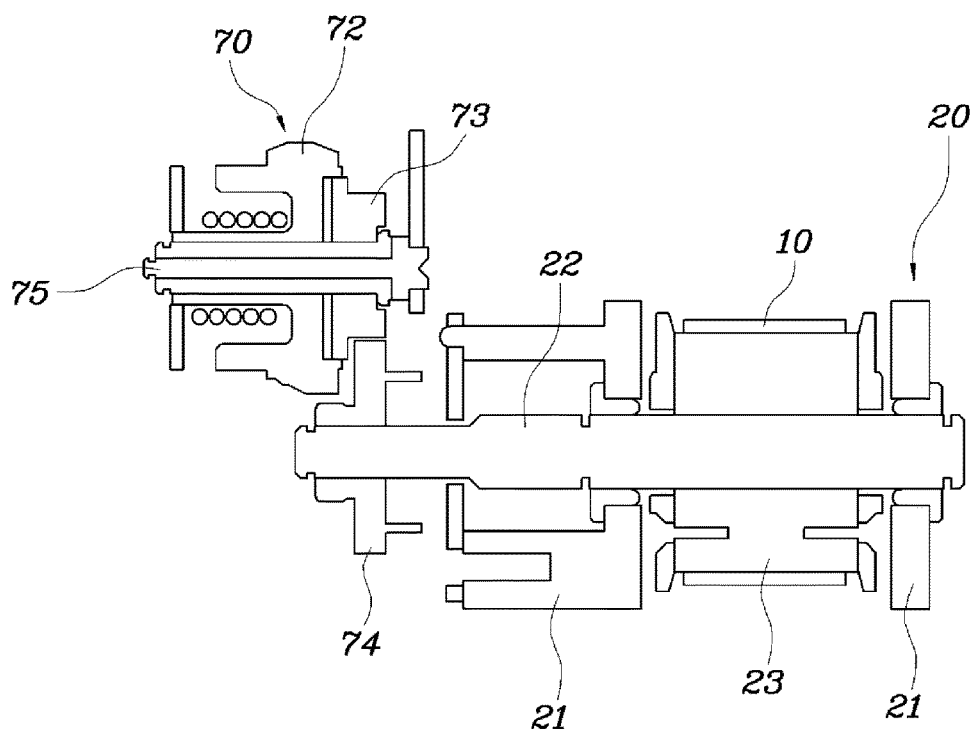
Figure 13:
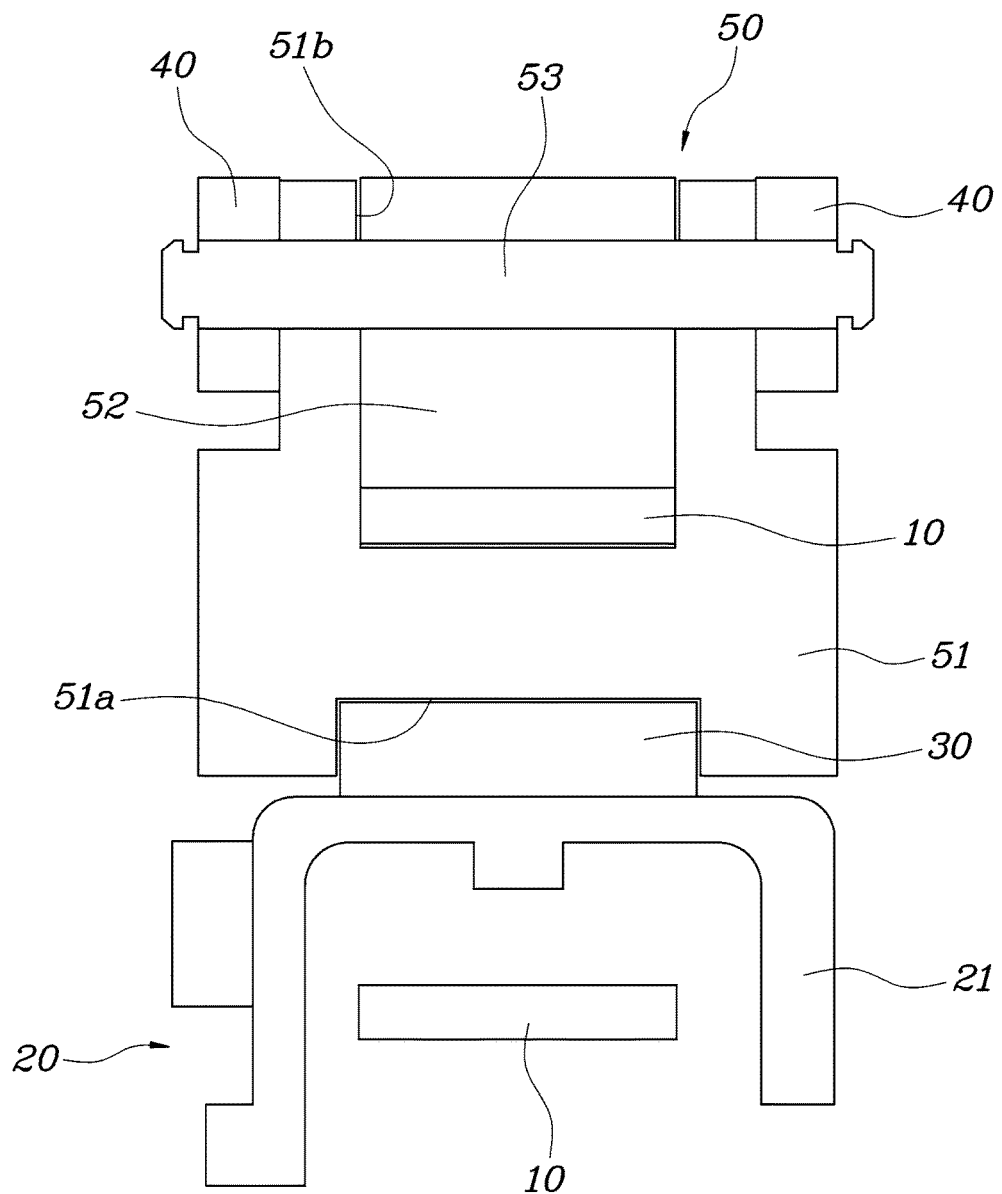
FIG. 13 is a cross-sectional view illustrating a connection portion of the monitor hinge according to an exemplary embodiment of the present invention.
Figure 14:
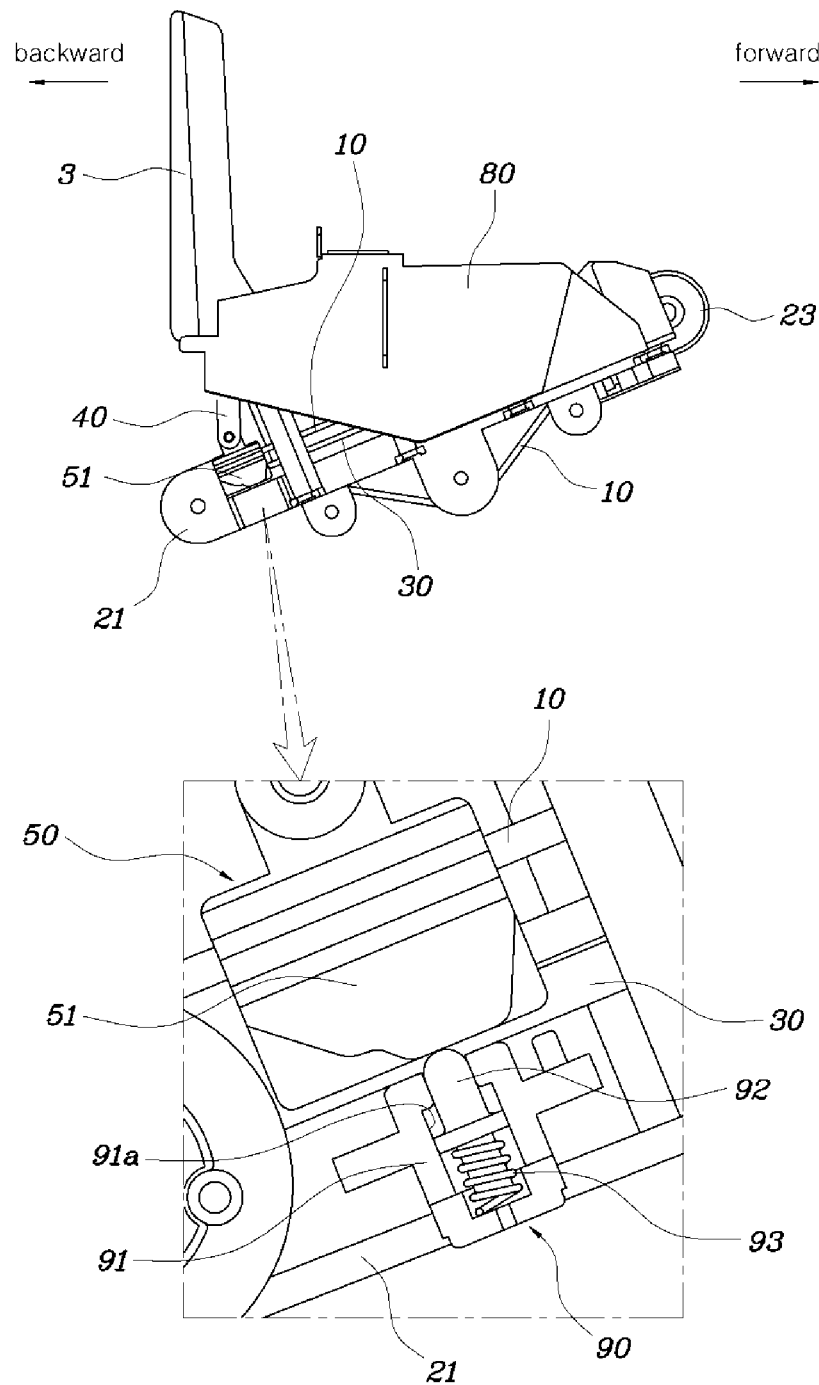
FIG. 14 is a diagram illustrating a tension module according to an exemplary embodiment of the present invention.

Through this operation, the AVN monitor 3 accommodated in the accommodation space 1a of the dashboard 1 is extended out of the accommodation space 1a, protruding upward from the upper surface of the dashboard 1 as illustrated by dotted lines in FIGS. 6, 8, and 14.

Since the AVN monitor 3 is supported by the support portions 81 of the brackets 80, the AVN monitor 3 is structured to move along a non-linear curved path so that the AVN monitor 3 can avoid coming into contact with the dashboard 1 when the AVN monitor 3 is retracted into or extended out of the accommodation space 1a of the dashboard 1.

The bottom surface of the AVN monitor 3 in the open state in which the AVN monitor 3 is fully extended out of the accommodation space 1a of the dashboard 1 is elastically supported by the tension pin 92 which is an element of the tension module 90. For this reason, the AVN monitor 3 is unlikely to shake when it is in the open state. That is, the AVN monitor 3 can be maintained in a stable position.

As described above, since the apparatus for operating the AVN monitor according to an exemplary embodiment of the present invention uses the driving force transmission gear 70 having a simple structure and the belt 10, the number of parts is reduced, resulting in a decrease in cost and weight of the apparatus.

In addition, since the apparatus uses the belt 10 generating less noise than the conventional cable which generates relatively severe noise, operational noise is dramatically reduced.

Furthermore, since the driving force transmission gear 70 has a structure not susceptible to external temperature change, and the belt 10 in which the metal wire 11 is embedded does not easily undergo tension change, the apparatus according to an exemplary embodiment of the present invention can operate the AVN monitor 3 smoothly and at a constant speed.

Yet furthermore, since the center portion of the lower end of the AVN monitor 3 is connected to the connection bracket 40, there is no variation in the amount of operation between the left and right portions of the AVN monitor 3, allowing the AVN monitor 3 to be stably operated.

Yet furthermore, since the monitor hinge 50 which is connected to the belt 10 is made up of the outer hinge 51 and the inner hinge 52 which can be taken apart from each other, the belt 10 can be easily replaced when it is worn out or damaged.

Yet furthermore, in the open state in which the AVN monitor 3 is fully extended out of the accommodation space 1a of the dashboard 1, since the AVN monitor 3 is supported by the tension module 90, the AVN monitor 3 is unlikely to shake. That is, the AVN monitor 3 can be maintained in a more stable position.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus with an AVN (Audio, Video and Navigation) monitor for operating the AVN monitor for a vehicle comprising a dashboard, the apparatus comprising:
   a belt guider which is configured to be installed in an accommodation space of the dashboard; a belt wound around the belt guider in a longitudinal direction of the belt guider;
   a guide rail fixed to the belt guider and extending in the longitudinal direction of the belt guider;
   a monitor hinge connected to the belt and engaged to the guide rail and an end of a connection bracket so as to move along the guide rail, wherein the connection bracket is connected to the AVN monitor; and
   a driving force transmission gear engaged with the belt to move the belt in the longitudinal direction, wherein the monitor hinge includes:
      an outer hinge moving along the guide rail;
      an inner hinge inserted in the outer hinge; and
      a hinge pin installed to pass through the outer hinge and the inner hinge, wherein the outer hinge includes a rail groove which is formed in a bottom surface and faces down and into which the guide rail is inserted, and a hinge groove which is formed, in a position corresponding to the rail groove, in a top surface and faces up, wherein the inner hinge is inserted in the hinge groove of the outer hinge, wherein the hinge pin is installed to pass through the outer hinge and the inner hinge so that the outer hinge and the inner hinge are securely fastened with each other, and the hinge pin allows an end of the connection bracket to be rotatably connected to the outer hinge, and
   wherein the belt is securely fastened with the monitor hinge and the belt is inserted between the outer hinge and the inner hinge.

2. The apparatus with the AVN monitor according to claim 1, further comprising:
   a body bracket including a support portion connected to the belt guider and supporting the AVN monitor to allow the AVN monitor to move along a non-linear curved path so as to be extended out of the accommodation space of the dashboard when the monitor hinge moves along the guide rail, and prevents the AVN monitor from collapsing.

3. The apparatus with the AVN monitor according to claim 1, further comprising: a tension module installed on the belt guider, the tension module elastically supporting a bottom surface of the AVN monitor in an open state in which the AVN monitor is configured to be fully extended out of the accommodation space of the dashboard.

4. The apparatus with the AVN monitor according to claim 3, wherein the belt guider includes:
   a guide plate configured to be extended in the longitudinal direction of the vehicle and to be installed in the accommodation space of the dashboard;
   a driving pulley which is provided at an end of the guide plate, is rotatably installed via a main shaft, and rotates by a driving force which is transmitted from a motor via the driving force transmission gear;
   a driven pulley which is rotatably installed at a remaining end of the guide plate; and the belt which is wound around the driving pulley and the driven pulley.

5. The apparatus with the AVN monitor according to claim 4, wherein the belt guider further includes:
   an idling roller and a pair of tension-adjusting rollers which are rotatably connected to the guide plate and installed between the driving pulley and the driven pulley, wherein the idling roller and the pair of tension-adjusting rollers contact the belt in order to adjust tension of the belt.

6. The apparatus with the AVN monitor according to claim 4, wherein the driving force transmission gear includes:
   a worm gear and a helical gear which are rotated by the driving force of the motor;
   a driving gear which rotates by receiving a driving force from the helical gear so that the driving gear rotates in the same direction as the helical gear; and
   a driven gear which meshes with the driving gear and is connected to an end of the main shaft.

7. The apparatus with the AVN monitor according to claim 6,
   wherein the worm gear and a shaft of the motor are combined; and
   wherein the motor is fixedly installed in the accommodation space and disposed at a side of the belt guider.

8. The apparatus with the AVN monitor according to claim 1, wherein the connection bracket is connected to a center position of a lower end of the AVN monitor.

9. The apparatus with the AVN monitor according to claim 1, wherein a metal wire is embedded in the belt so that tension change of the belt attributable to external temperature change is minimized.

10. The apparatus with the AVN monitor according to claim 1, wherein the tension module includes:
    a tension housing which is fixed to the guide plate and has an operation groove therein;
    a tension pin which is installed to move along the operation groove, and an end of which protrudes from the tension housing and is in contact with a bottom surface of the outer hinge; and
    a tension spring which is installed in the operation groove and respective ends of which are supported by the tension housing and the tension pin, the tension spring giving elastic force to the tension pin so that the tension pin presses a bottom surface of the outer hinge.

11. The apparatus with the AVN monitor according to claim 10, wherein an end of the tension pin which is in contact with the bottom surface of the outer hinge has an arc shape so that the bottom surface of the outer hinge smoothly moves over the end of the tension pin.

* * * * *